(12) United States Patent
Suda et al.

(10) Patent No.: US 7,445,687 B2
(45) Date of Patent: Nov. 4, 2008

(54) COMPONENT FABRICATING METHOD AND PNEUMATIC TIRE

(75) Inventors: Nobuyuki Suda, Kodaira (JP); Akira Kubota, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 230 days.

(21) Appl. No.: 10/514,793

(22) PCT Filed: May 26, 2003

(86) PCT No.: PCT/JP03/06535

§ 371 (c)(1),
(2), (4) Date: Nov. 19, 2004

(87) PCT Pub. No.: WO03/101715

PCT Pub. Date: Dec. 11, 2003

(65) Prior Publication Data

US 2005/0178488 A1  Aug. 18, 2005

(30) Foreign Application Priority Data

May 24, 2002  (JP) ............................. 2002-150515

(51) Int. Cl.
*B29D 30/38* (2006.01)

(52) U.S. Cl. ................. 156/266; 156/117; 156/134; 156/264; 156/304.5; 156/906

(58) Field of Classification Search ............... 156/117, 156/134, 133, 264, 266, 304.5, 906, 907; 152/548, 558, 560
See application file for complete search history.

(56) References Cited

U.S. PATENT DOCUMENTS

| | | | |
|---|---|---|---|
| 3,826,297 A * | 7/1974 | Alderfer | 152/542 |
| 3,933,565 A | 1/1976 | Printz et al. | |
| 4,552,602 A * | 11/1985 | Landsness | 156/157 |
| 5,709,760 A * | 1/1998 | Prakash et al. | 152/556 |
| 6,280,556 B1 | 8/2001 | Okada et al. | |
| 2001/0045254 A1 | 11/2001 | Senbokuya et al. | |
| 2003/0051794 A1* | 3/2003 | Suda et al. | 156/123 |

FOREIGN PATENT DOCUMENTS

EP    0 453 294 A2    10/1991

(Continued)

*Primary Examiner*—Geoffrey L Knable
(74) *Attorney, Agent, or Firm*—Sughrue Mion, PLLC

(57) ABSTRACT

A tire component is fabricated by the steps of forming a narrow belt by arranging a plurality of cords and embedding the cords in a rubber layer, cutting the belt into strips of a predetermined length, and successively arranging and joining a necessary number of the strips such that edge parts of adjacent strips overlap each other with the outermost cord in the edge part of one of the adjacent strips overlying the outermost cord in the edge part of the other strip. The strips can be surely joined without requiring advanced techniques, without wasting materials and without increasing weight. Thus a desired annular tire component can be accurately formed in a desired circumference. The cords are arranged in each strip in a width equal to a length shorter than a length equal to an integral division of the predetermined circumference of a tire by a length corresponding to an increase in the diameter of the tire component. A tire component of a predetermined circumference can be accurately formed by increasing the diameter of an annular ply fabricated by successively joining an integral number of the strips such that the edge parts of the adjacent strips overlap each other with the outermost cord in the edge part of one of the adjacent strips superposed on the outermost cord in the edge part of the other strip. A pneumatic tire including the thus formed carcass ply thus fabricated has an improved quality.

6 Claims, 8 Drawing Sheets

FOREIGN PATENT DOCUMENTS

| | | |
|---|---|---|
| EP | 0 498 215 A2 | 8/1992 |
| EP | 1 072 395 A1 | 1/2001 |
| JP | 3-178427 A | 8/1991 |
| JP | 08-127083 A * | 5/1996 |
| JP | 2001-287257 A | 10/2001 |
| JP | 2001-322403 A | 11/2001 |

* cited by examiner

①

②

③

COMPONENT FABRICATING METHOD AND PNEUMATIC TIRE

TECHNICAL FIELD

The present invention relates to a tire component fabricating method of fabricating a component of a tire by successively connecting strips formed by embedding cords in a rubber layer, and a pneumatic tire.

BACKGROUND ART

Various previously proposed tire component fabricating methods is intended to form a tire component by joining strips in a butt joint in which the strips are fastened edge to edge.

However, the formation of a reliable butt joint is difficult because the corresponding edges of the strips are irregular and the butt joint often includes air. Consequently, it is difficult to utilize the strength of tire cords when plies are extended, it is difficult to form an annular structure having a necessary circumference, advanced techniques are required, and those previously proposed tire component fabricating method are difficult to carry out even though expensive equipment is necessary.

DISCLOSURE OF THE INVENTION

The present invention has been made in view of the foregoing circumstances and it is therefore an object of the present invention to provide a tire component fabricating method capable of surly joining together strips to form a tire component accurately in a necessary circumference and not requiring expensive equipment, and to provide a pneumatic tire employing this tire component.

A tire component fabricating method in one aspect of the present invention includes the steps of: forming a narrow belt by arranging a plurality of cords and embedding the cords in a rubber layer; cutting the belt into strips of a predetermined length; and building a tire component by successively arranging and joining a necessary number of the strips such that edge parts of adjacent strips overlap each other with an outermost cord in edge part of one of the adjacent strips overlying an outermost cord in the edge part of the other strip.

Since the strips are arranged successively and adjacent strips are joined such that the edge parts of the adjacent strips of the predetermined length overlap each other with the outermost cord in the edge part of one of the adjacent strips overlying the outermost cord in the edge part of the other strip, the strips can be surely joined without requiring advanced techniques, without wasting materials and without increasing weight. The overlapping edge parts of the adjacent strips can be easily and firmly joined together, and a desired annular tire component can be accurately formed in a desired circumference by successively joining a necessary number of the strips.

The overlapping edge parts of the adjacent strips can be easily and firmly joined together, and a desired annular tire component can be accurately formed in a desired circumference by successively joining a necessary number of the strips such that edge parts of adjacent strips overlap each other with two or more cords in the edge parts of the strips may not be superposed, and arranging the cords in the edge parts forming the joints at a pitch shorter than that at which the cords are arranged in parts other than the joints.

The cords are arranged in each strip in a width equal to a length shorter than a length equal to an integral division of the predetermined circumference of a tire employing the tire component by a length corresponding to an increase in the diameter of the tire component. The tire component of a predetermined circumference can be accurately formed by successively joining the integral number of the strips such that the edge parts of the adjacent strips overlap each other with the outermost cord in the edge part of one of the adjacent strips superposed on the outermost cord in the edge part of the other strip.

The edge parts of the adjacent strips can be firmly joined and the joint of the edge parts contains air scarcely when a slope is formed in at least a part of each edge part by gradually thinning down the part of the edge part toward the edge.

The edge parts of the adjacent strips can be firmly joined and the joint of the edge parts contains air scarcely when the edge parts are shaped to form sharp edges.

The tire component fabricating method is suitable for fabricating a tire component reinforced by cords to be used as plies for building an inner wall of a tire.

A pneumatic tire of an improved quality can be manufactured by using a carcass ply formed by a carcass ply fabricating method including the steps of: forming a narrow belt by arranging a plurality of cords and embedding the cords in a rubber layer; cutting the belt into strips of a predetermined length; and successively arranging and joining a necessary number of the strips such that edge parts of the adjacent strips overlap each other with an outermost cord in the edge part of one of the adjacent strips superposed substantially on an outermost cord in the edge part of the other strip.

BEST MODE FOR CARRYING OUT THE INVENTION

A preferred embodiment of the present invention will be described with reference to FIGS. 1 to 7.

The first embodiment of the present invention is a ply forming method of forming a ply, namely, a tire component.

Figure 1:
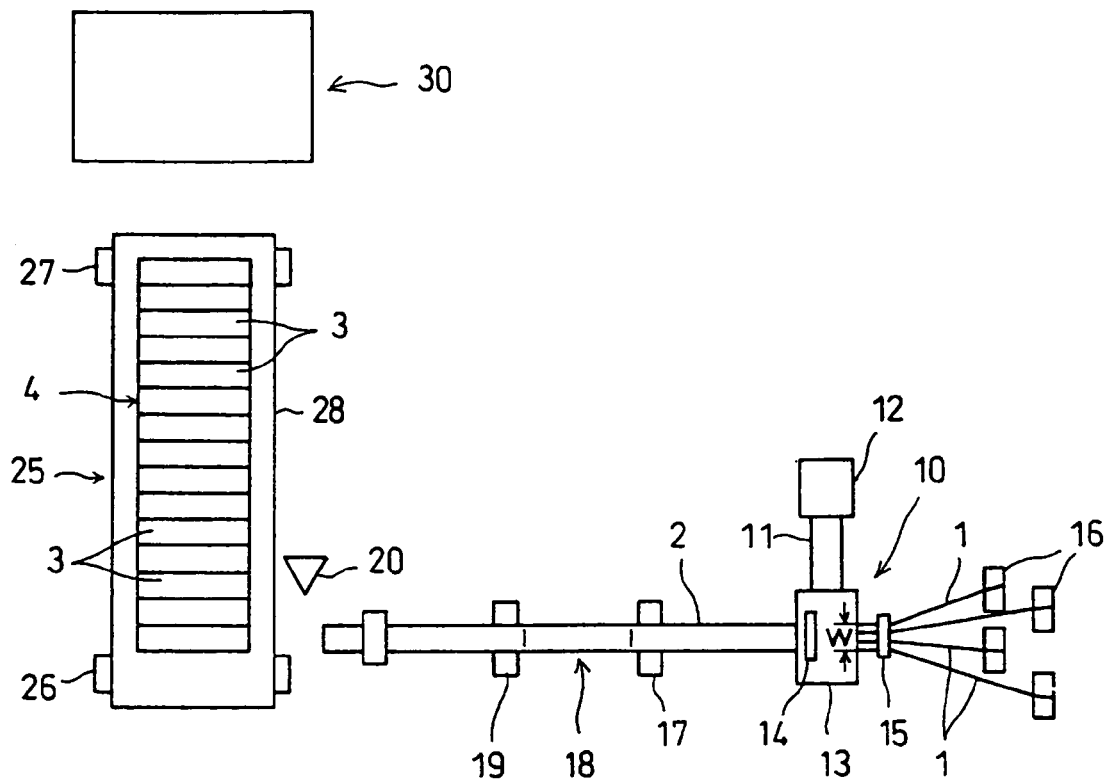
FIG. 1 is a schematic plan view of a ply fabricating system for carrying out a ply fabricating method in a preferred embodiment of the present invention.
Figure 2:
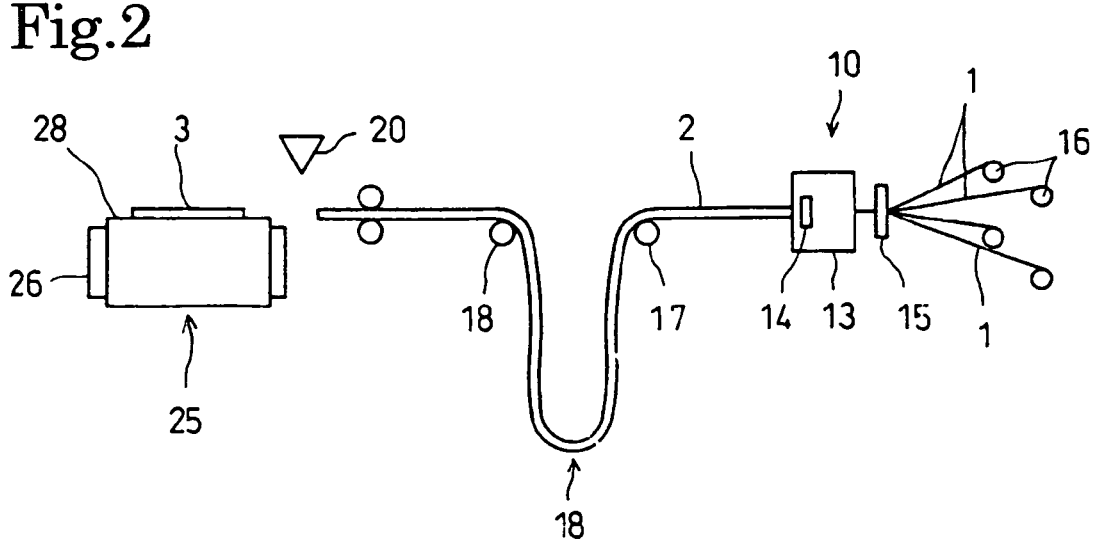
FIG. 2 is a schematic side elevation of the ply fabricating system shown in FIG. 1.

FIGS. 1 and 2 shows, in schematic views, a ply fabricating system for carrying out the ply forming method in the first embodiment.

An extruder 10 has a cylinder 11 internally provided with a screw, and a hopper 12 connected to the cylinder 11 to feed a material into the cylinder 11.

The material loaded into the hopper 12 is a ply-forming rubber material or the like. The rotating screw kneads the ply-forming rubber material fed into the cylinder 11 and forces the kneaded ply-forming rubber material through a discharge end of the cylinder 11 into a die 14 of a predetermined shape held in an insulation head 13.

An inserter 15 is disposed behind the die 14 held in the insulator head 13 of the extruder 10. A plurality of reels 16 are disposed behind the inserter 15. A plurality of cords 1, such as steel cords or resin cords, unwound from the reels 16 are arranged parallel to each other in a horizontal plane by the inserter 15, and the parallel cords 1 are fed forward into the die 14. The parallel cords 1 are embedded in the die 14 in the ply-forming rubber material, and a continuous belt 2 formed by embedding the parallel cords 1 in the ply-forming rubber material and shaped by the die 14 in a predetermined shape, is extruded from the die 14.

The distance W between the outermost cords 1 among the parallel cords 1 is 76.9 mm, which is shorter by a length corresponding to an increase in the diameter of an extended ply than π in. (about 80 mm). Edge parts 2a of the belt 2 extend laterally outward from the outermost cords 1, respectively, by 3 mm and hence the width of the belt 2 is 82.9 mm (FIG. 3).

Figure 3:
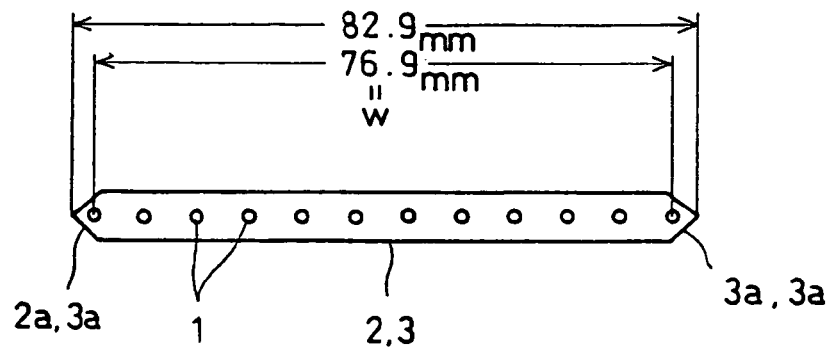
FIG. 3 is a sectional view of a strip obtained by cutting a belt.

The edge parts 2a of the belt 2 are shaped in a sectional shape resembling an isosceles triangle as shown in FIG. 3. The opposite slopes of the edge parts 2a are inclined such that the thickness of the edge parts 2a decreases toward the edges of the belt 2.

The belt 2 of this shape is extruded continuously through the die 14 and is wound round a pull drum 17. The belt 2 pulled by the pull drum 17 is delivered via an idle roller 19 to a belt conveyor 25. The belt 2 is slackened in a festoon 18 between the pull roller 17 and the idle roller 19.

A cutter 20 is disposed before the belt conveyor 25.

The belt conveyor 25 includes rollers 26 and 27, and a conveyor belt 28 extended between the rollers 26 and 27. The cutter 20 cuts the belt 2 into strips 3 of a predetermined length. The strips 3 are delivered to a predetermined receiving position on the conveyor belt 28 in a direction perpendicular to a conveying direction in which the belt conveyor 25 conveys the strips 3.

Figure 4:
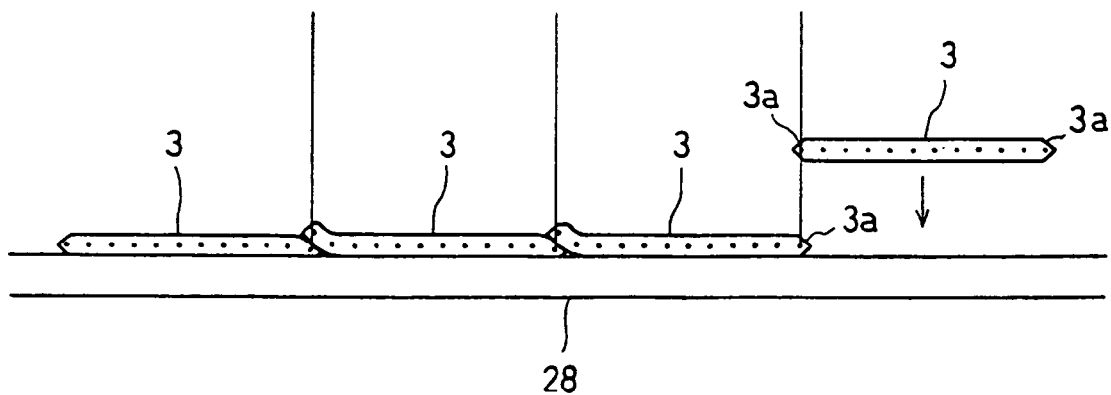
FIG. 4 is a schematic side elevation for explaining a strip joining process for successively joining the strips.

A preceding strip 3 delivered onto the conveyor belt 28 is advanced for a predetermined distance by driving the belt conveyor 25, and then a succeeding strip 3 is delivered onto the conveyor belt 28 such that the leading edge part of the succeeding strip 3 and the trailing edge part of the preceding strip 3 overlap each other with the outermost cord 1 in the leading edge part of the succeeding strip 3 superposed on the outermost cord 1 in the trailing edge part of the preceding strip 3 as shown in FIG. 4.

The strip 3 has opposite edge parts 3a shaped in a sectional shape resembling an isosceles triangle. Therefore, a strip joining method bonds the edge parts 3a together by laying the edge parts 3a of the strips 3 so that the inner end of the lower slope of the edge part 3a of the upper strip 3 comes into contact with the inner end of the upper slope of the edge part 3a of the lower strip 3 as shown in FIG. 5(1), and compressing the edge parts 3a so that the same slopes slide relative to each other and are joined completely as shown in FIG. 5(2).

Figure 6:
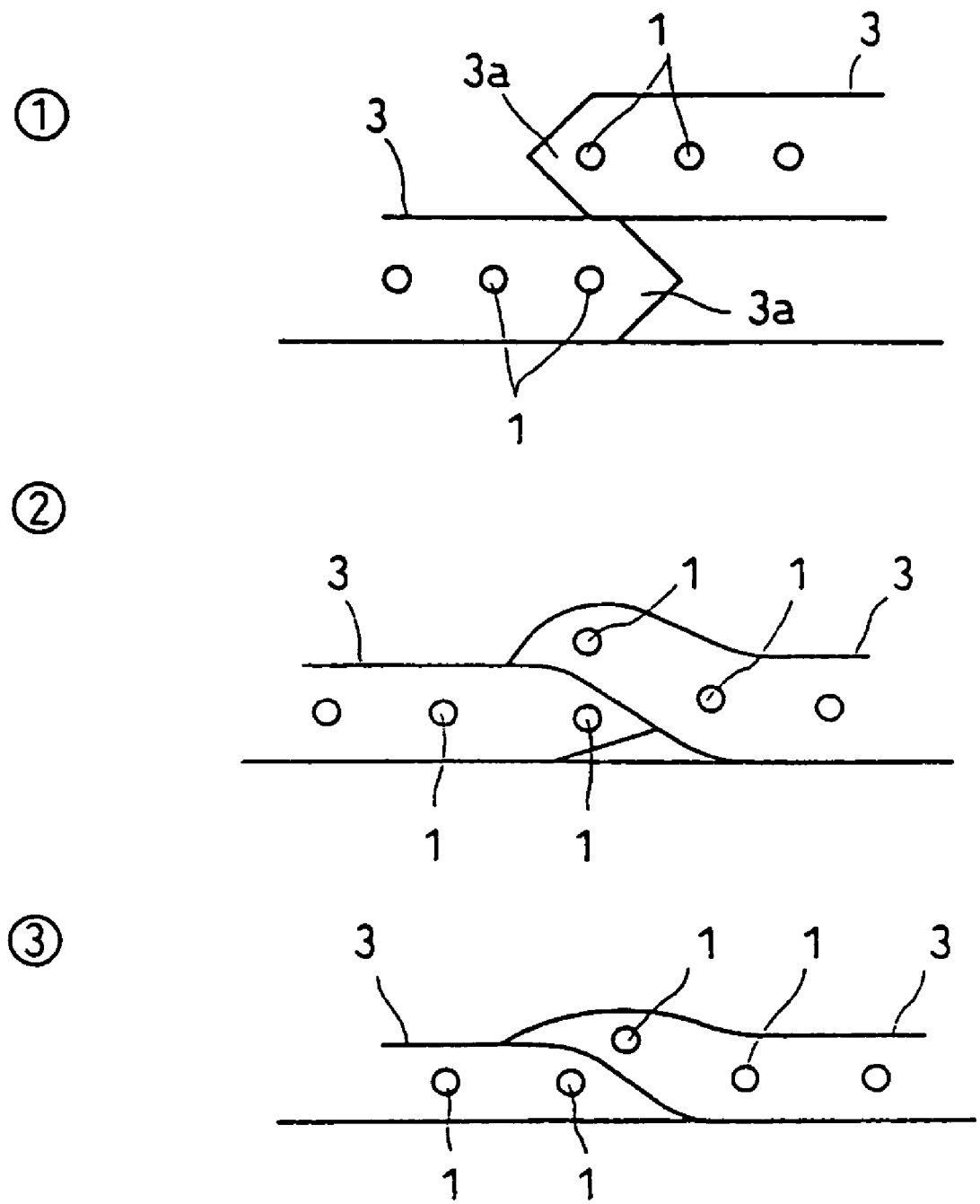
FIG. 6 is an enlarged, schematic side elevation of the strips shown in FIG. 3 in successive steps of another strip joining process.

Another strip joining method bonds the edge parts 3a together by laying the edge parts 3a of the strips 3 so that the lower flat surface of the upper strip 3 comes into contact with the upper flat surface of the lower strip 3 as shown in FIG. 6(1), and compressing the edge parts 3a so that the slopes of the edge parts 3a slide relative to each other and are joined completely as shown in FIG. 6(2).

When the edge parts 3a of the adjacent strips 3 are bonded together by either of the foregoing strip joining methods, the corresponding slopes of the edge parts 3a of the adjacent strips 3 slide relative to each other so that any air may not be caught between the slopes. Consequently, a joint not including any air is formed and the adjacent strips 3 can be firmly joined together.

Figure 5:
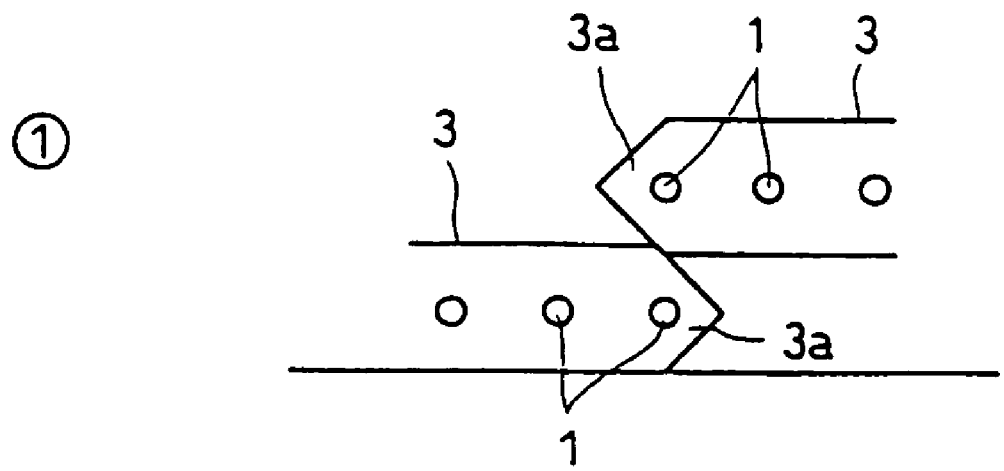
FIG. 5 is an enlarged, schematic side elevation of the strips in successive steps of a strip joining process.
Figure 5:
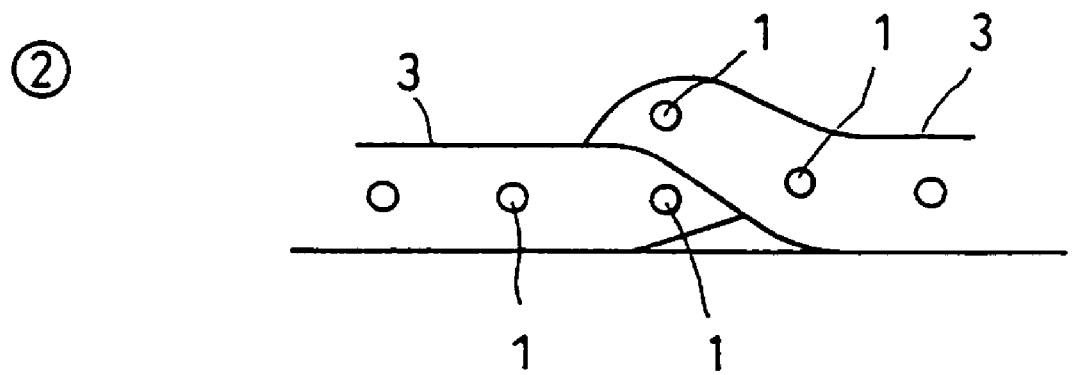
Figure 5:
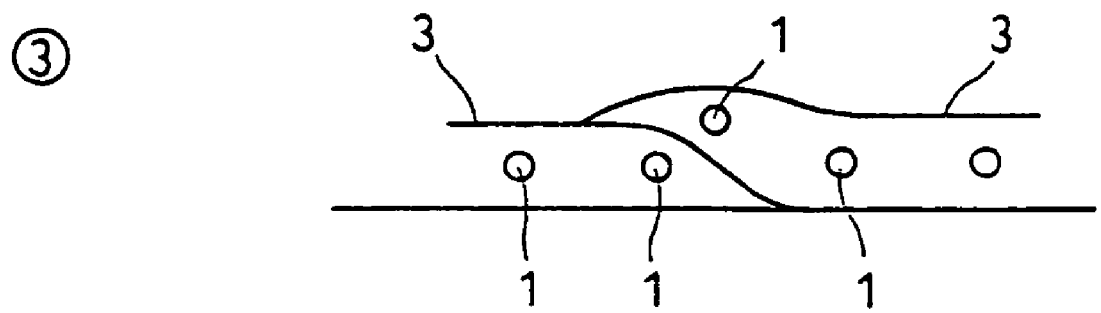

When a ply formed by thus successively joining the strips 3 is extended during vulcanization, the ply-forming rubber material around the joints flows and the cords 1 overlapping each other in the joints are dislocated from each other as shown in FIG. 5(3) or FIG. 6(3), in which those cords 1 are arranged like those in joints formed by joining strips in a butt joint.

Reliable joints can be formed because the distance between the adjacent cords in the joints is shorter than a pitch at which the cords are arranged in parts of the ply other than the joints. A strong joint cannot be formed and, sometimes, durability is unsatisfactory, if the joint is formed by overlapping the edge parts each other with the cords 1 in the edge parts spaced laterally apart.

If a joint is formed by overlapping the edge parts each other with two or more cords 1 of each of the edge parts overlapped each other, the joint bulges, the materials are wasted, the weight increases, the cost increases, and the balance is worsened.

The conveyor belt 28 of the belt conveyor 25 moves intermittently to shift the strips 3 supported thereon for a predetermined distance, such as 76.9 mm, at a time. The strips 3 cut in the predetermined length are delivered successively onto the conveyor belt 25. The n strips 3 are arranged successively and are joined successively in the foregoing manner to form a ply 4 of a predetermined length.

The ply 4 formed by this embodiment is for a 15 in. tire. The ply 4 is formed by successively joining the fifteen 500 mm long strips 3.

Figure 7:
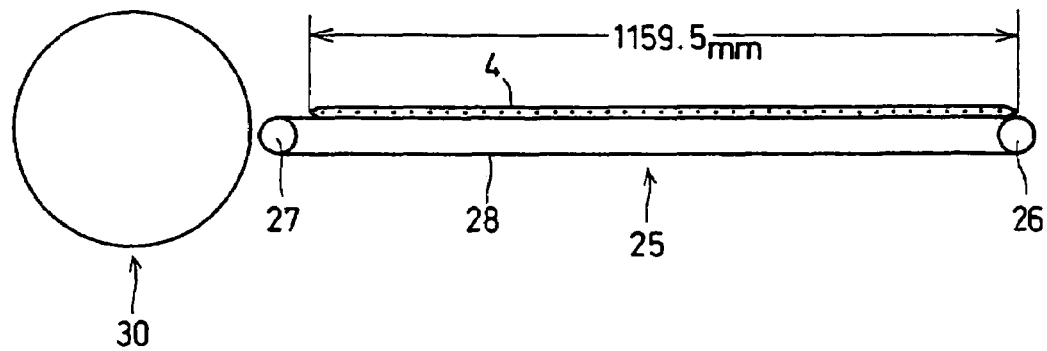
FIG. 7 is a schematic side elevation for explaining steps of a carcass forming process that winds a ply around a forming drum.
Figure 7:
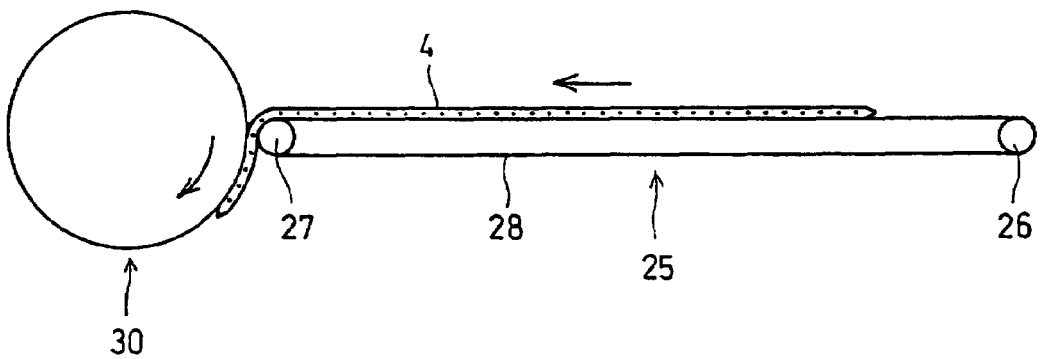
Figure 7:
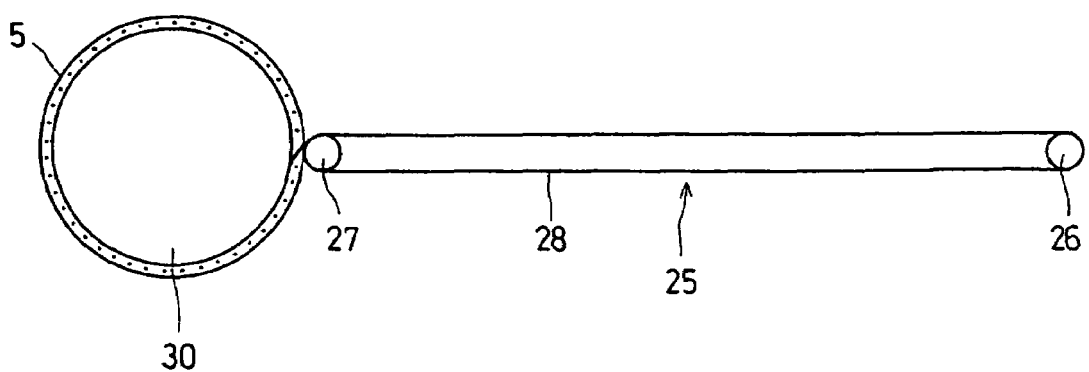

The ply 4 thus formed has a width of 500 mm and a length of 1159.5 mm=76.9×15+3+3 mm (FIG. 7(1)).

A forming drum 30 is disposed below the belt conveyor 25. FIG. 7 is a view for explaining steps of a winding process for winding the ply 4 around the forming drum 30.

The belt conveyor 25 can be moved toward and away from the forming drum 30. The belt conveyor 25 is separated from the forming drum 30 during the process for forming the ply 4 by successively joining the strips 3 as shown in FIG. 7(1). In this state, an inner liner can be wound around the forming drum 30. After the ply 4 has been formed on the conveyor belt 28, the belt conveyor 25 operates to carry the ply 4 toward the forming drum 30 and, at the same time, the belt conveyor 25 is moved close to the forming drum 30. Then, as shown in FIG. 7(2), the ply 4 is held between the roller 27 and the forming drum 30, the roller 27 and the forming drum 30 are rotated in the opposite directions, respectively, to transfer the ply 4 from the belt conveyor 25 to the forming drum 30.

After the ply 4 is transferred to the forming drum 30 so as to wrap the forming drum 30, the leading edge and the trailing edge of the ply 4 are joined together to form an annular ply 5, namely, a carcass ply.

The leading and the trailing edge part of the annular ply 5 can be surely joined together with the outermost cord 1 in the leading edge part of the annular ply 5 superposed on the outermost cord 1 in the trailing edge part of the same when the forming drum 30 has a circumference of 1156.5 mm=76.9 mm×15.

When the diameter of the annular ply 5 is increased to couple the annular ply 5 to tire beads, the annular ply 5 is extended and the outermost cords 1 overlapping each other are dislocated from each other as shown in FIG. 5③ or FIG. 6③, and the circumference of parts, coupled to the tire beads, of the annular ply 5 increases to about 1197 mm.

The circumference of the tire beads of a 15 in. tire is 1197 mm=π×25.4×15 mm. Thus the annular ply 5 can be satisfactorily accurately formed in a desired circumference.

The successive strips 3 can be surely joined without requiring any special, advanced techniques by arranging the cords 1 of each strip 3 in a width W equal to the predetermined length of 76.9 mm. The annular ply 5 having the predetermined circumference of 1156.5 mm can be easily and accurately formed by successively joining the fifteen strips 3 such that the edge parts of the adjacent strips 3 overlap each other with the outermost cord 1 in the edge part of one of the adjacent strips 3 superposed on the outermost cord 1 in the edge part of the other strip 3. The circumference of the annular ply 5 can be satisfactorily accurately adjusted to the length for the 15 in. tire by a vulcanizing process.

Since any advanced techniques are not necessary, costly equipment is unnecessary.

The annular ply for the 15 in. tire can be formed by successively joining the fifteen strips 3 having the plurality of cords 1 arranged in the predetermined width W of 76.9 mm in the manner mentioned above.

Similarly, an annular ply for the n in. tire can be formed by successively joining the n strips 3 in the manner mentioned above; that is, an annular ply for a 16 in. tire can be formed by successively joining the sixteen strips 3, and an annular ply for a 17 in. tire can be formed by successively joining the seventeen strips 3.

An annular ply for a desired tire can be formed by successively joining an integral number of strips each including a number of cords arranged in a width equal to an integral division of the predetermined length 76.9 mm.

A pneumatic tire having an improved quality can be built by using the accurately formed carcass ply.

Figure 8:
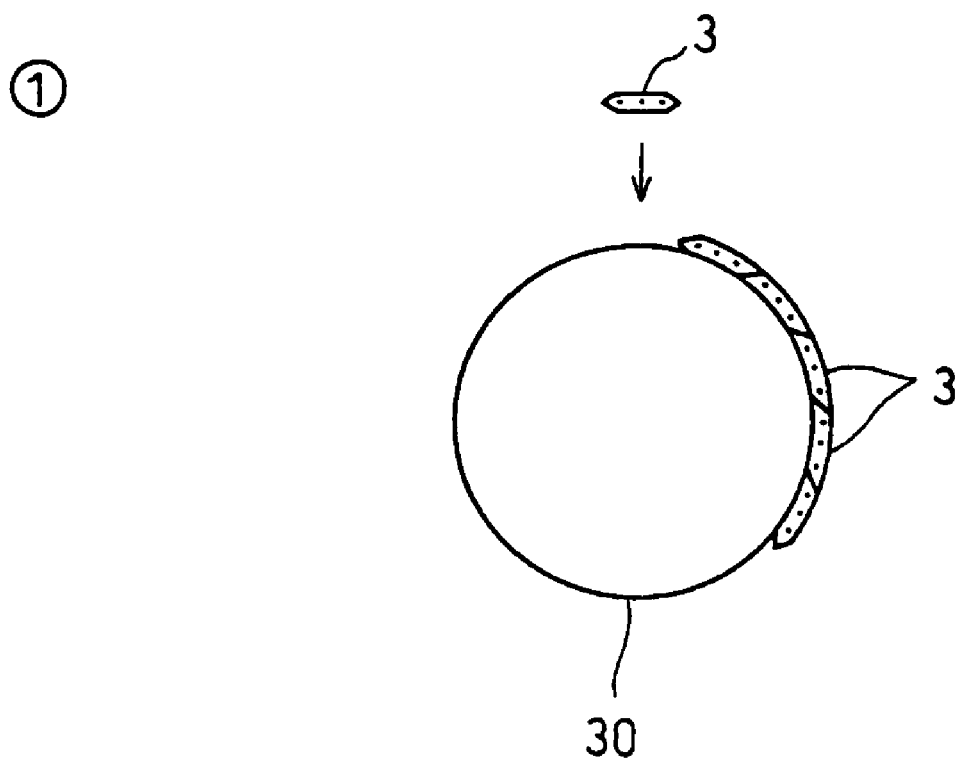
FIG. 8 is a schematic side elevation for explaining steps of another carcass forming process that forms a ply on a forming drum by directly applying the strips.
Figure 8:
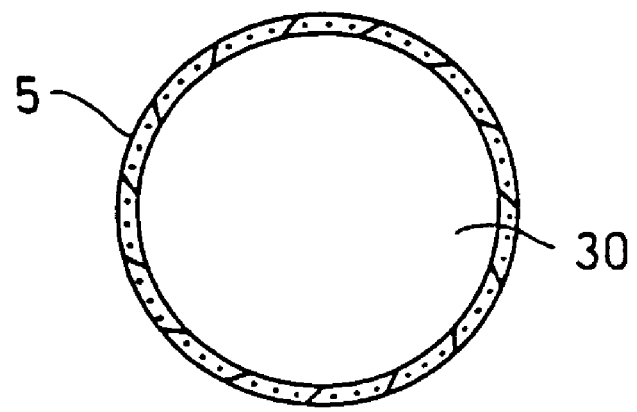

The tire component fabricating method in this embodiment forms the ply 4 by successively joining the strips 3 on the belt conveyor 25 and transfers the ply 4 from the belt conveyor 25 to the forming drum 30. The annular ply 5 may be formed as shown in FIG. 8② by successively applying the strips 3 directly to the forming drum 30 as shown in FIG. 8①.

Another tire component fabricating method applies the strips 3 successively to a transfer drum, successively joins the strips 3, and transfers the successively joined strips 3 to a forming drum.

Since the adjacent strips 3 are joined such that the edge parts of the adjacent strips 3 overlap each other with the outermost cords in the corresponding edge parts of the adjacent strips 3 overlying each other, the strips 3 can be surely joined and the annular ply 5 can be accurately formed in a desired circumference by successively joining a necessary number of the strips 3.

Since the ply does not need to be formed by successively joining the strips 3 on the belt conveyor, and carcass ply can be formed by a small number of steps using a less number of pieces of equipment and hence floor space necessary for installing the equipment can be reduced.

Figure 9:
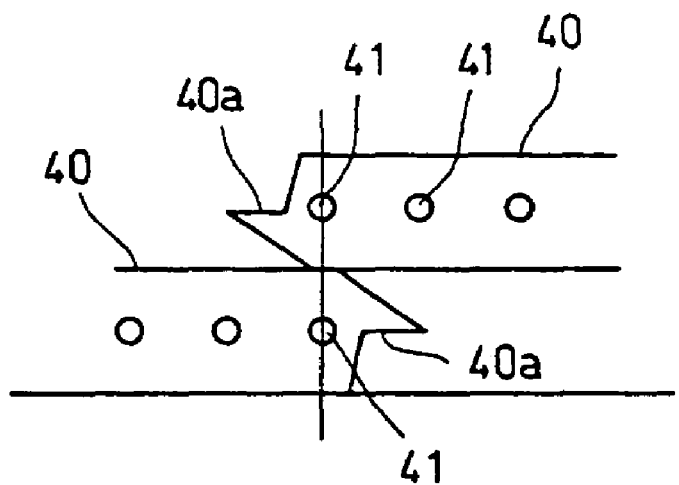
FIG. 9 is an enlarged, schematic side elevation of strips used for forming a ply by a ply fabricating method in another embodiment of the present invention in successive steps of a strip joining process.
Figure 9:
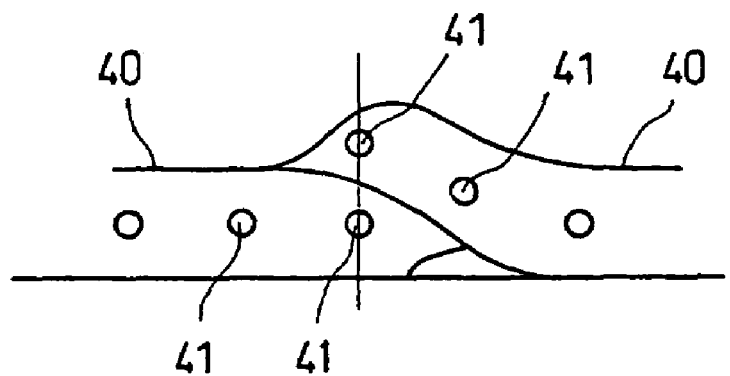
Figure 9:
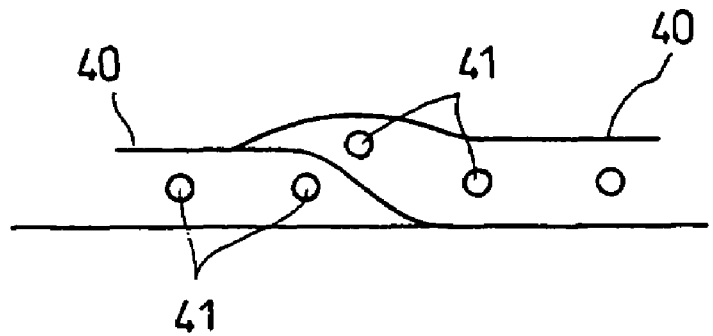

FIG. 9 is a schematic view for explaining a tire component fabricating method in another embodiment of the present invention. This tire component fabricating method joins successively strips 40 having edge parts 40a having a shape different from that of the edge parts 3a of the strips 3.

Referring to FIG. 9, the edge part 40a of the strip 40 has the shape of a sharp edge having a sectional shape resembling a half isosceles triangle having one slope 40b. As shown in FIG. 9①, the adjacent strips 40 are placed with outermost cords 41 in the corresponding edge parts 40a of the adjacent strips 40 overlapping each other so that the slopes 40b of the edge parts 40a of the adjacent strips 40 may come into contact with each other.

The strips 40 are arranged so that the lower flat surface of the upper strip 40 is in contact with the upper flat surface of the lower strip 40 as shown in FIG. 9①, and the edge parts 40a are compressed so that the slopes 40b of the edge parts 40a slide relative to each other and are joined completely as shown in FIG. 9②.

When the corresponding slopes 40b of the edge parts 40a of the adjacent strips 40 slide relative to each other, any air may not be caught between the slopes 40b. Consequently, a joint not including any air is formed, the adjacent strips 40 can be firmly joined together, the volume of the rubber material forming the joint can be reduced and the quality of the joint can be improved.

When the ply formed by thus successively joining the strips 40 is extended during vulcanization, the ply-forming rubber material around the joints flows and the cords 41 overlapping each other in the joints are dislocated from each other as shown in FIG. 9③. Thus an annular ply can be satisfactorily accurately formed in a desired circumference.

Since each of the edge parts 40a of the strips 40 have the shape resembling a half isosceles triangle, the rubber material forming the joint has a small volume, and the joint can be formed in a flat, not bulging shape.

Figure 10:
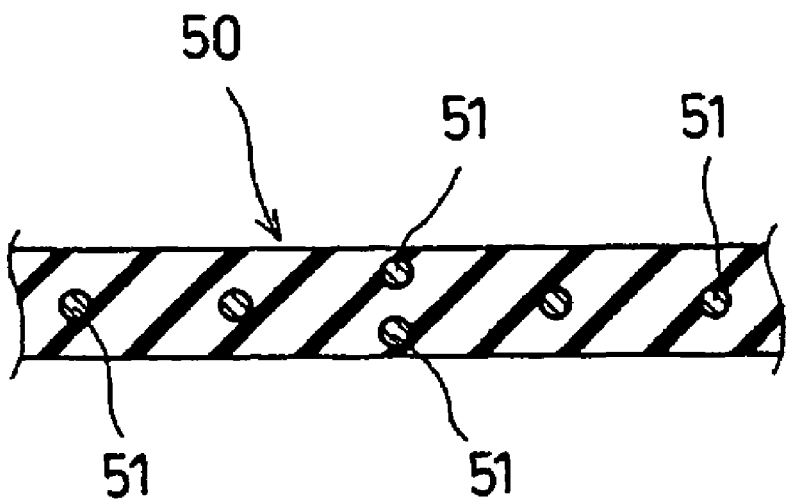
FIG. 10 is a sectional view of a joint in a carcass ply for a pneumatic tire after vulcanization.

FIG. 10 shows one of joints in a carcass ply 50 formed by superposing the edge parts of the adjacent strips with the outermost cords in the corresponding edge parts overlapping each other, and successively joining the edge parts of the strips included in a pneumatic tire.

As shown in FIG. 10, the outermost cords 51 in the joint of the carcass ply 50 of the vulcanized pneumatic tire overlap each other to improve the quality of the pneumatic tire.

INDUSTRIAL APPLICABILITY

The present invention is applied to the production of tires.

This invention claimed is:

1. A tire component fabricating method comprising the steps of:

forming a narrow belt by arranging a plurality of cords and embedding the cords in a rubber layer;

cutting the belt into strips of a predetermined length; and building a tire component by successively arranging and joining a necessary number of the strips such that edge parts of adjacent strips overlap each other with an outermost cord in one of the adjacent strips superposed on an outermost cord in the other strip, wherein:

said step of forming a narrow belt further includes completely embedding each of the outermost cords in the adjacent strips in a rubber layer;

said step of building a tire component is carried out with the outermost cord in one of the adjacent strips positioned directly above and aligned with the outermost cord in the other of the adjacent strips;

at least a part of each of the edge parts of each strip is formed with a slope inclined such that thickness of the edge part decreases toward an edge of the strip; and said step of building a tire component further includes bonding the edge parts together by laying the edge parts of the adjacent strips so that the edge part of the upper strip comes into mutual contact with the edge part of the lower strip and compressing the mutually contacting edge parts of the upper and lower strips so that the slopes of the upper and lower strips are joined completely, with a tip portion of the compressed edge part of the upper strip joined to an upper surface of the lower strip, in a manner to prevent any air from being caught between the slopes.

2. The tire component fabricating as claimed in claim 1, wherein the cords are arranged in the edge parts forming joints at a pitch shorter than that at which the cords are arranged in parts other than the joints.

3. The tire component fabricating method according to claim 1, wherein the tire component is a ply.

4. A tire component fabricating method comprising the steps of:

forming a narrow belt by arranging a plurality of cords and embedding the cords in a rubber layer;

cutting the belt into strips of a predetermined length; and building a tire component by successively arranging and joining a necessary number of the strips such that edge parts of adjacent strips overlap each other with an outermost cord in one of the adjacent strips superposed on an outermost cord in the other of the adjacent strips, wherein:

said step of forming a narrow belt further includes completely embedding each of the outermost cords in the adjacent strips in a rubber layer;

at least a part of each of the edge parts of each strip is formed with opposite slopes forming a triangular shape such that thickness of the edge part decreases toward an edge of the strip, the opposite slopes being inclined with respect a width direction of the strip; and said step of building a tire component further includes bonding the edge parts together by laying the edge parts of the adjacent strips so that the edge part of the upper strip comes into mutual contact with the edge part of the lower strip, and compressing the mutually contacting edge part of the upper and lower strips so that mutually facing slopes of the upper and lower strips are joined completely.

5. The tire component fabricating method as claimed in claim 4, wherein the cords are arranged in the edge parts forming joints at a pitch shorter than that at which the cords are arranged in parts other than the joints.

6. The tire component fabricating method according to claim 4, wherein the tire component is a ply.

* * * * *